(12) United States Patent
Huang et al.

(10) Patent No.: US 12,132,714 B2
(45) Date of Patent: Oct. 29, 2024

(54) INTERNET PROTOCOL SECURITY (IPSEC) SECURITY ASSOCIATIONS (SA) BALANCE BETWEEN HETEROGENEOUS CORES IN MULTIPLE CONTROLLER SYSTEM

(71) Applicant: HEWLETT PACKARD ENTERPRISE DEVELOPMENT LP, Houston, TX (US)

(72) Inventors: Huimeng Huang, Beijing (CN); Jianpo Han, Beijing (CN); Zhijun Ren, Beijing (CN); Chunfeng Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 261 days.

(21) Appl. No.: 17/672,011

(22) Filed: Feb. 15, 2022

(65) Prior Publication Data
US 2023/0262035 A1    Aug. 17, 2023

(51) Int. Cl.
*H04L 67/1004*    (2022.01)
*H04L 9/40*    (2022.01)
(Continued)

(52) U.S. Cl.
CPC ...... *H04L 63/0485* (2013.01); *H04L 12/4633* (2013.01); *H04L 63/029* (2013.01);
(Continued)

(58) Field of Classification Search
USPC ........................................................ 713/151
See application file for complete search history.

(56) References Cited

U.S. PATENT DOCUMENTS

| | | | |
|---|---|---|---|
| 7,215,667 B1 * | 5/2007 | Davis | H04L 63/061 370/464 |
| 2009/0319775 A1 * | 12/2009 | Buer | H04L 63/0428 713/153 |

(Continued)

OTHER PUBLICATIONS

Juniper Networks, Inc., "Configuring Security Associations," Mar. 26, 2021, <https://web.archive.org/web/20210621163038/https://www.juniper.net/documentation/us/en/software/junos/security-services/topics/topic-map/configuring-security-associations.html#i, 8 pages.

(Continued)

*Primary Examiner* — Sakinah White Taylor
(74) *Attorney, Agent, or Firm* — Sheppard Mullin Richter & Hampton LLP (57) ABSTRACT

Systems are methods are provided for implementing load balancing of IPsec security associations (SAs) SAs between different heterogeneous cores, for example in a multiple controller systems. The balancing of IPsec SAs are performed using software implementations of IPsec offloading and/or hardware implementations of IPsec offloading. By balancing the processing functions related to orchestration of IPsec SAs between hardware (e.g., IPsec hardware accelerator) and software (e.g., IPsec software accelerator), the methods realize increased optimization, improved user experience, and enhanced product performance in networks using IPsec. For example, an IPsec session is initiated, and it is determined whether a resource limitation for a hardware-based IPsec accelerator has been reached. If the limitation for the hardware-based IPsec accelerator has been reached, processing for the IPsec SA for the initiated IPsec session is offloaded to a software-based IPsec accelerator.

16 Claims, 7 Drawing Sheets

(51) Int. Cl.
*H04L 12/46* (2006.01)
*H04L 67/141* (2022.01)

(52) U.S. Cl.
CPC ........ *H04L 63/164* (2013.01); *H04L 67/1004* (2013.01); *H04L 67/141* (2013.01)

(56) References Cited

U.S. PATENT DOCUMENTS

| | | | | |
|---|---|---|---|---|
| 2010/0130171 | A1* | 5/2010 | Palanigounder | H04W 12/069 455/411 |
| 2013/0124930 | A1* | 5/2013 | Deuri | H04L 63/0485 714/708 |
| 2013/0155861 | A1* | 6/2013 | Bryers | H04L 9/40 370/235 |
| 2016/0197836 | A1* | 7/2016 | Hussain | H04L 47/2491 713/160 |
| 2022/0174095 | A1* | 6/2022 | Rahman | H04L 9/0852 |

OTHER PUBLICATIONS

Juniper Networks, Inc., "IPsec Security Associations Overview," Mar. 26, 2021, <https://web.archive.org/web/20210508083417/https://www.juniper.net/documentation/us/en/software/junos/security-services/topics/topic-map/ipsec-security-associations-overview, 2 pages.

* cited by examiner

INTERNET PROTOCOL SECURITY (IPSEC) SECURITY ASSOCIATIONS (SA) BALANCE BETWEEN HETEROGENEOUS CORES IN MULTIPLE CONTROLLER SYSTEM

BACKGROUND

Optical communication technology is used in some computing networks to increase speed, cable length and overall bandwidth for communication between different networking devices (e.g., server device to a network router, among network switches). One such networking application, which employs optical communication technology (e.g., optical cables, optical transceiver modules), is storage networking. Particularly, storage area networks (SAN) can employ optical fiber connections to achieve long range network communication. For example, when optical communication technologies and optical interfaces are employed, A SAN is capable of offering data rates up to 128 Gbps across metropolitan area distances (e.g., up to about 6 miles or 10 km). Furthermore, optical components, such as optical transceivers, are increasingly being integrated into networking devices. For instance, switches that are employed in storage networking may be equipped with optical transceivers in order to leverage the enhanced capabilities of optical communication technology to the tackle the unique demands of storage networking, such as data growth, demanding workloads, and high-performance.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

The figures are not intended to be exhaustive or to limit various embodiments to the precise form disclosed. It should be understood that various embodiments can be practiced with modification and alteration.

DETAILED DESCRIPTION

Internet Protocol Security (IPsec) IPsec encryption is utilized in some network deployments as a protocol that supports data encryption for security purposes. In an example of a network architecture that employs IPsec encryption, the access point (AP) can setup an encrypted IPsec tunnel with a controller. Subsequently, the uplink and/or downlink traffic is sent through the established IPsec tunnel in a manner that supports secure communication as packets of information are transported across network boundaries. As network interface rates increase (e.g., 100 Gbps) with the continued expansion of distributed computing, there is a desire to minimize the processing overheads associated with IPsec. To address these concerns, there are a variety of implementation options available that are dedicated to primarily processing the IPsec-related functions (also referred to herein as IPsec offloading), and thus can be used to improve processing efficiency for the overall system. As an example, IPsec offloading can be used to reduce CPU cycles spent doing compute intensive operations (e.g., within the IPsec processing tasks, the encryption/decryption tasks are the most compute intensive).

IPsec offloading implementations range from a software implementation using optimized CPU instructions, to the use of hardware for offloading various aspects of IPsec packet processing. For example, a hardware implementation for IPsec hardware offloading can utilize a cryptographic accelerator integrated circuit (IC) chip (e.g., on an extension circuit board) to load off the very computing intensive tasks of encryption/decryption and compression/decompression for IPsec, where IPsec may be running on separate cores. By offloading IPsec processing from a host processor, using either a hardware-based or software-based implementation, its efficiency may be improved. As an example, a system employing a hardware implementation, such as a cryptographic accelerator chip, for IPsec offloading can achieve 1 Gbps~2 GBps throughput. A system employing a software implementation (e.g., software modules executing the encryption/decryption functions for IPsec) can reach 100 Mbps~300 Mbps throughput, for example.

However, there are design trade-offs that can be attributed to using software implementations or hardware implementations of IPsec offloading, respectively. For instance, software implementations for IPsec offloading still consumes the CPU cores cost of the host computer system (associated with not running on a separate dedicated hardware). Thus, when employing software implementation for IPsec offloading, the CPU may become the bottleneck, providing lower performance for data traffic (e.g., 100 Mbps~300 Mbps throughput) in comparison to the hardware implementations. In contrast, CPU cores of the host computer system will not be disturbed with the hardware implementation for IPsec offload, since the IPsec encryption/decryption functions are performed inside of the cryptographic accelerator chip, for instance, without consuming processing resources of the cores on the host. Thus, with respect to hardware implementations of IPsec offloading, there are limitations on the number of IPsec tunnels that can be supported simultaneously with controllers. As a result, there are some computer architectures, such as expansive multiple controller systems, that may require a larger number of secure connections than is supported by the IPsec tunnel capability of hardware implementations for IPsec offloading. As an example, there may be a number of controllers requiring secure connections, which is greater than the number of IPsec tunnels that the hardware implementation for IPsec offloading can support at once. In order to optimize IPsec offloading, the disclosed embodiments include methods and systems supporting various distributions of IPsec functionality, for example in multiple controller systems, in a manner that is flexible and adaptively optimized for the particular network architecture deployed.

The disclosed embodiments can utilize a hybrid IPsec offloading approach that can leverage the benefits of both the hardware implementations and the software implementations of IPsec offloading. In other words, the disclosed embodiments load balance IPsec security associations (SAs) SAs between different heterogeneous cores in multiple controller systems using software implementations of IPsec offloading and/or hardware implementations of IPsec offloading. Accordingly, the disclosed embodiments may realize increased optimization, improved user experience, and enhanced product performance in networks using IPsec for security features.

Figure 1:
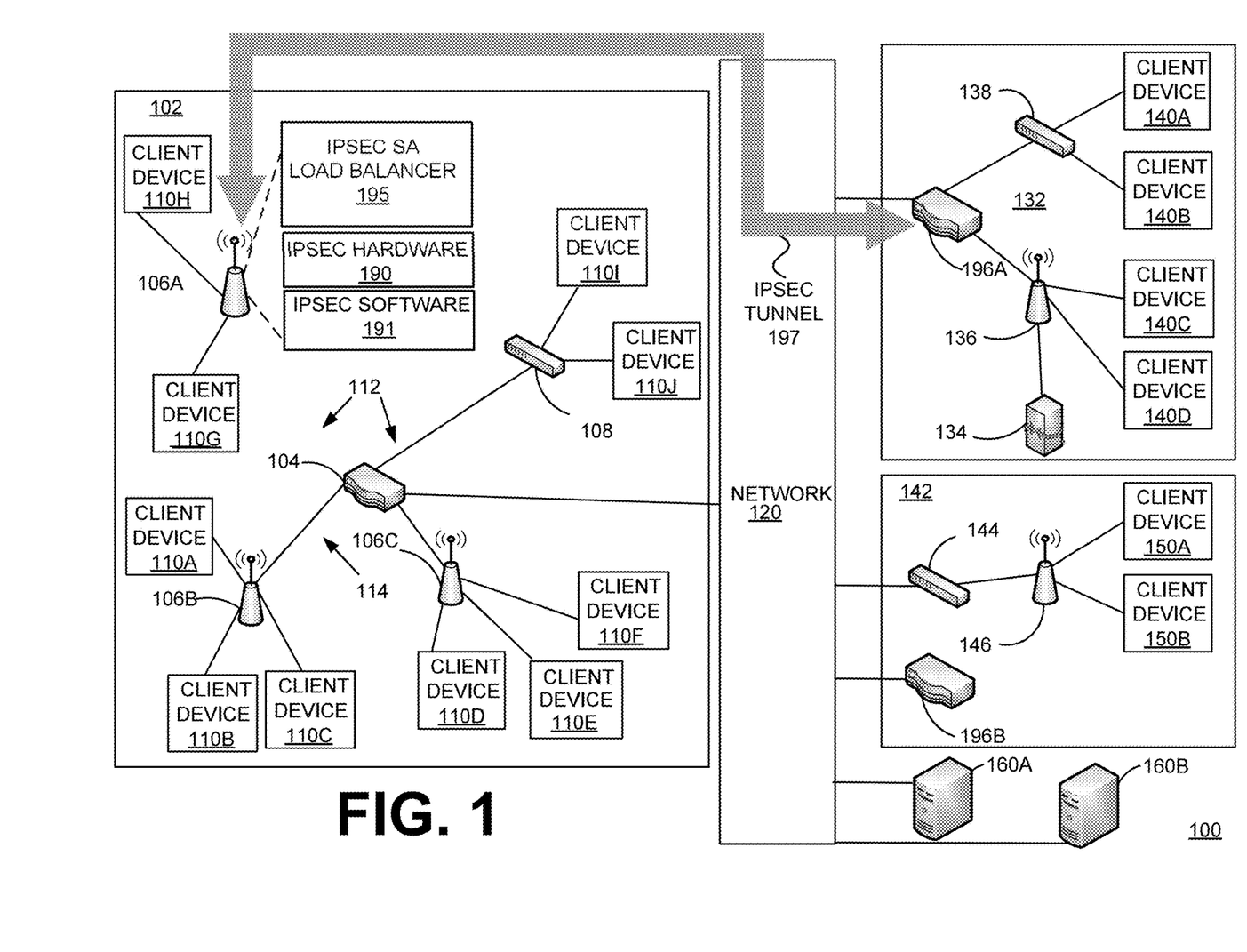
FIG. 1 illustrates an example networking environment in which Internet Protocol Security (IPsec) Security Associations (SAs) and the disclosed IPsec SA balancing technology may be implemented, in accordance with the disclosure.

An example network configuration 100 with which the IPsec SA load balancing systems and methods might be implemented in various applications is depicted in FIG. 1. For example, the network configuration 100 may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102. The network configuration 100 also includes controllers 196a and 196b that are distributed at remote sites 132 and 142, respectively. Although a single controller 196a or 196b is illustrated at each site, the remote sites 132 and 142 may include multiple controllers and/or multiple communication points with network 120.

The controllers 104, 196a, 196b may be operable to configure and manage network devices. For example, controller 104 manages the network devices at the primary site 102, and may also manage network devices at the remote sites 132, 134. The controllers 104, 196a, 196b may be operable to configure and/or manage switches, routers, access points, and/or client devices connected to a network. The controllers 104, 196a, 196b may itself be, or provide the functionality of, an access point.

The controllers 104, 196a, 196b may be in communication with other network devices. As shown, controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices, such as 110a-110j, may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IoT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

Furthermore, FIG. 1 illustrates that the AP 106a can be configured to include: IPsec accelerator hardware 190, such as a coprocessor that is particularly used for offloading IPsec related functions from the CPU resources of the AP; IPsec accelerator software 191, such as specialized processing software that is particularly used for offloading IPsec related functions from the CPU resources of the AP; and an IPsec load balancer 195 which implements the IPsec SA balancing aspects disclosed herein, in order to distribute the IPsec functions between the IPsec accelerator hardware 190 and the IPsec accelerator software 191 in a manner that is optimally balanced based on the network deployment used. As a general description, the IPsec SA load balancer 195 distributes the processing related to establishing IPsec tunnels (e.g., encryption/decryption) to be performed between the IPsec accelerator software 191 (e.g., software implementation of IPsec offloading) and the IPsec accelerator hardware 190 (e.g., hardware implementation of IPsec offloading). Accordingly, the IPsec tunnels, such as IPsec tunnel 197 can establish a secure VPN over an otherwise unsecure (e.g., public) network 120, such as the Internet. While the embodiment of FIG. 1 is described as establishing IPsec tunnels with APs, it should be understood that the disclosed technology may be employed to orchestrate IPsec SAs and establish IPsec tunnels with any network points capable of supporting that function, such as gateways, branch gateways, and controllers connected via Layer3 Network.

For context, IPsec describes a secure network protocol suite of standards that use cryptography to secure communications over Internet Protocol (IP) networks. It may be used to authenticate endpoint hosts along with providing data confidentiality and integrity. IPsec may use the Internet Key Exchange (IKE) protocol to authenticate each peer in an IPsec session, negotiate security associations (SAs) between peers, and handle the exchange of session keys. IKE is a component of IPsec used for performing mutual authentication and establishing and maintaining SAs.

An IPsec data exchange between two peers may include five steps: i) initiating an IPsec session; ii) IKE Phase 1; iii) IKE Phase 2; iv) data transfer; and v) IPsec session termination. An IPsec session initiation (e.g., a VPN tunnel) may be triggered when network traffic is flagged for protection according to some IPsec security policy (SP) configured in IPsec peers. For example, network traffic determined to be of a particular type may be flagged for protection based on a security policy, whereas other traffic may travel normally through a public network. After session initiation, an IKE process may begin. During IKE phase 1, security parameters and keys required to establish an IKE security association (SA) may be negotiated. IKE phase one may include: authenticating identities of IPsec peers; the negotiation of a common IKE SA policy between peers to protect IKE exchange; a Diffie-Hellman (DH) key exchange for the creation of shared secret keys; and setting up a secure tunnel to negotiate IKE Phase 2 parameters.

During IKE phase 2, the two peers may negotiate a shared IPsec policy; and negotiate the security parameters and incoming/outgoing security keys required to establish two unidirectional IPsec SAs (e.g., one for incoming traffic and one for outgoing traffic). Thereafter, traffic may be exchanged during the IPsec session, with packets being encrypted/decrypted at peers using encryption specified in an IPsec SA. Additionally, traffic may be authenticated.

The devices at either end of an IPsec tunnel are considered IPsec peers. Referring back to FIG. 1, AP 106a and controller 196a connected via IPsec tunnel 197 can be considered IPsec peers. To build the IPsec tunnel 197, IPsec peers, for instance AP 106a and controller 196a, exchange a series of messages about encryption and authentication, and attempt to agree on many different parameters during the VPN negotiations process, as described in detail above. One device of the IPsec peers operates as the initiator in the negotiation sequence, and the other device is the responder. As an example, AP 106a can be the initiator in the negotiation, while the controller 196a functions as the responder.

The IPsec SA load balancer 195 can be implemented as a combination of hardware, software, and/or firmware of an AP, such as AP 106a. The IPsec SA load balancer 195 can be configured to selectively balance the IPsec functions between offloading to the IPsec hardware accelerator 190 and the IPsec software accelerator 191. Furthermore, the IPsec hardware accelerator 190 can be one or various hardware implementations, including, but not limited to: an integrated circuit (IC) chip; a processor; as special purpose CPU (e.g., core); and a coprocessor. In addition, the IPsec software accelerator 191 can be one or various software implementations, including, but not limited to: software module(s); instruction set; application; and firmware.

For example, the IPsec SA load balancer 195 can make a determination to establish a defined number of IPsec tunnels (or IPsec SAs) using the IPsec accelerator hardware 190, and then switch IPsec offloading to the IPsec accelerator software 191. The IPsec accelerator software 191 can then be used to establish any additional number of IPsec tunnels (or IPsec SAs), for instance in networks including a plurality of heterogenous controllers. The IPsec SA load balancer 195 is configured to give priority to applying the IPsec hardware accelerator 190, and also to give priority for setting up IPsec tunnel with certain controllers. For example, a controller having a high performance requirement, or a controller that is involved in the IPsec data process can be prioritized by the IPsec SA load balancer 195. Therefore, by prioritizing the higher efficiency of hardware-based IPsec offloading implementations (e.g., using the IPsec hardware accelerator 190 until a maximum threshold of the hardware's resource limitations are reached), the IPsec SA load balancer 195 can realize an improved usage for the AP 106a with respect to IPsec capabilities.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-140d.

In various embodiments, the remote site 132 may be in direct communication with primary site 102, such that client devices 140a-d at the remote site 132 access the network resources at the primary site 102 as if these client devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-150b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public wide area network (WAN), such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

As an example, relating to FIG. 1, IPsec can be enabled in the network configuration 100, as the network layer security protocol. FIG. 1 illustrates AP 106*a* establishing an IPsec tunnel 197 with controller 196*a* for secure communication. Accordingly, the AP 106*a* must perform additional processing for providing encryption and integrity protection on IPsec packets communicated via the IPsec tunnel 197. However, the network configuration 100 could include an extensive number of controllers to provide connectivity, security, and accessibility for separate networks, such as remote sites 132, 142. As a result, in operation, the AP 106*a* may need to support multiple IPsec tunnels simultaneously (e.g., an individual IPsec tunnel for each controller) in order to provide secure communications to the controllers of the respective networks. As previously described, the AP 196*a* is enabled with both the IPsec hardware accelerator 190 and the IPsec software accelerator 191 for establishing IPsec SAs. For example, the IPsec tunnel 197 may be among a group of IPsec tunnels (not shown) orchestrated by the AP 106. Further, after setting up the IPsec tunnel 197, the IPsec SA load balancer 195 may determine that the AP 106*a* has now reached a limit for the number of IPsec tunnels that can be supported by the IPsec hardware accelerator 190.

Continuing with the example, the AP 106*a* may need to establish another IPsec tunnel with controller 196B for secure communications to remote site 142. However, with the IPsec SA load balancer 195 being aware that the IPsec hardware accelerator 190 has reached the maximum of its resource limitations, it may be detrimental to attempt to bring up any additional IPsec tunnels using hardware-based IPsec offloading. A key aspect of the disclosed embodiments is the capability to switch an AP's IPsec offloading between the hardware implementation and software implementation, as deemed appropriate. In this example, the IPsec SA load balancer 195 can begin to utilize the IPsec software accelerator 191 of the AP 106*a* to establish any subsequent IPsec SAs after the IPsec hardware accelerator 190 has reached a maximum threshold of its resource limitation. Consequently, the IPsec SA load balancer 195 can control the AP 106*a* to begin executing the IPsec software accelerator 191, and set-up the IPsec SA with controller 196B. The IPsec tunnel to controller 196B will be supported by the IPsec software accelerator 191, for instance using the IPsec software accelerator 191 to perform the encryption/decryption. The disclosed IPsec SA load balancing techniques allow the APs in the network configuration 100 to deploy IPsec in a multiple controller system in a flexible and customizable manner, without violating and/or overextending the resource limitations of any one IPsec offloading implementation. It should be appreciated that implementations described herein do not need to be limited to the network topology illustrated in FIG. 1. For instance, in the enterprise context, IPsec may be implemented to provide remote-access VPN to individual user devices, to provide intranet VPNs to connect remote sites, and/or to provide extranet VPNs. In the case of remote-access VPN access being provided to a user device (e.g., user's laptop), the user device may itself contain a VPN client configured to run an IPsec application and it may function as an IPsec networking device in accordance with the disclosure.

Figure 2:
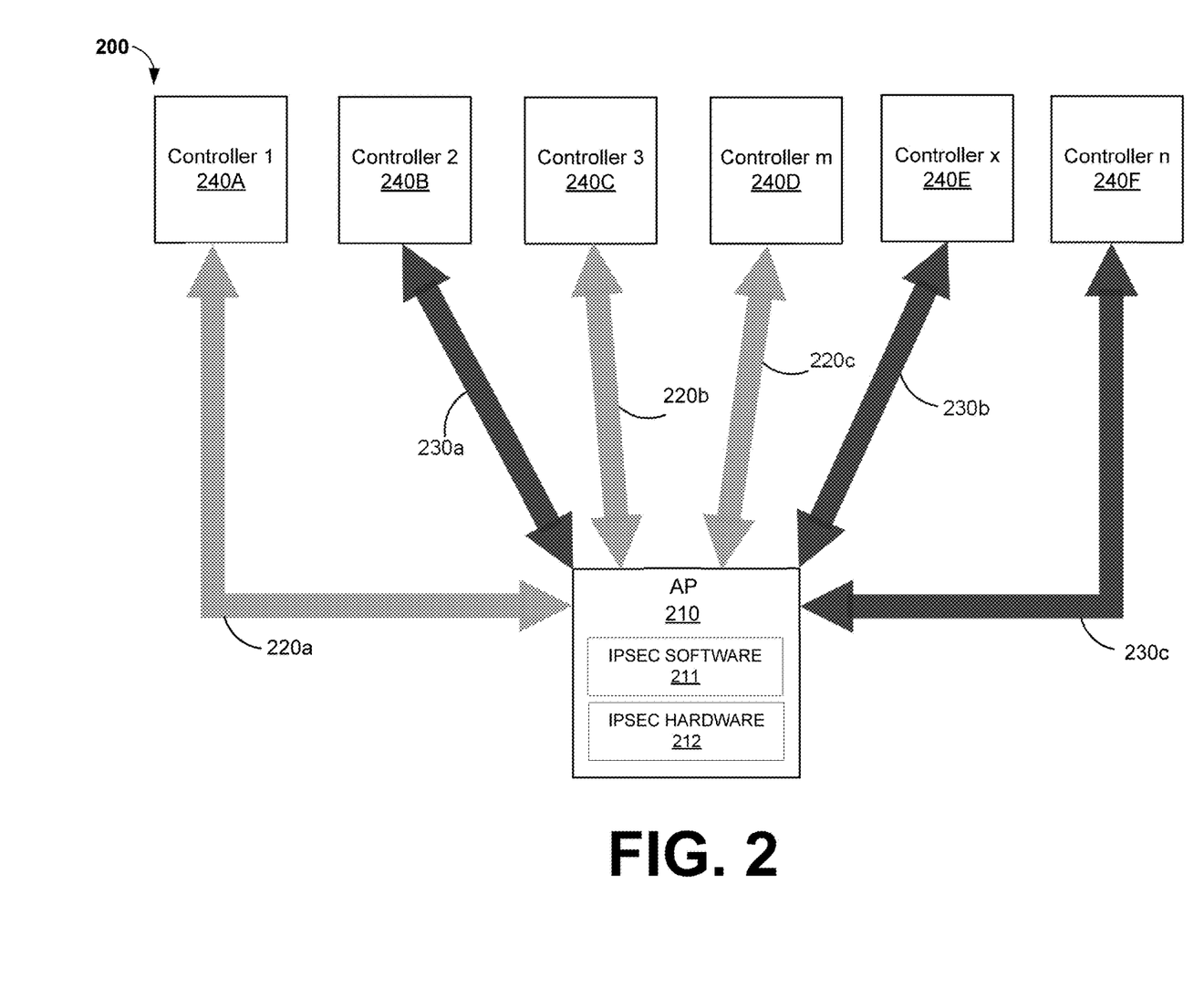
FIG. 2 illustrates an example of a multiple controller networking environment for implementing the disclosed IPsec SA balancing technology, in accordance with the disclosure.

FIG. 2 illustrates an example environment 200 where the disclosed IPsec SA balancing techniques may be employed, particularly in a non-cluster multiple controller network configuration. FIG. 2 includes substantially similar elements and functions as described above in reference to FIG. 1. Therefore, the general structure and function of these elements in FIG. 2, such as the controllers 240*a*-240*f*, AP 210, IPsec software accelerator 211, and IPsec hardware accelerator 212 are not described again in detail. In the example, an AP 210 has secure communications established with multiple controllers, shown as controllers 240*a*-240*f*. The controllers 240*a*-240*f* are considered to be non-clusters, as each of the controllers 240*a*-240*d* can correspond to a separate network, as oppossed to multiple controllers being grouped together, or clustered, within the same site (shown in FIG. 3).

In accordance with the IPsec SA balancing techniques, as disclosed herein, the AP 210 is configured to identify an IPsec priority that corresponds to each of the controllers 240*a*-240*f*. For purposes of illustration, the IPsec priority values that are described herein include a high priority, and a low priority. However, the embodiments can employ various forms of priority designations, such as parameters, numerical values, conditions, levels, ranges, and the like. In some embodiments, each controller 240*a*-240*f* has an IPsec priority that is previously assigned. For instance, the controller 240*a*-240*f* can be assigned either a low priority or a high priority (e.g., by a network administrator) while deploying the network setup. In some embodiments, the IPsec priority for each of the controllers 240*a*-240*f* can be dynamically determined based on various network performance related characteristics, such as an amount of traffic, Airslice quality, QOS requirements, and the like. For instance, the IPsec priority can be assigned to a controller such that the IPsec traffic performance for that controller is improved, to in turn, improve the voice or video quality. In some embodiments, the IPsec priorities can be determined using a combination of static and dynamic characteristics, as described above.

As an example, the IPsec priority for each of the controllers 240*a*-240*f* can be dynamically determined by the AP 210. For example, as traffic flows are communicated between the AP 210 and the controllers 240*a*-240*f*, the AP 210 can determine whether any of the controllers 240*a*-240*f* are experiencing a volume of traffic volume that is considered as "high traffic" (e.g., traffic above a threshold, traffic within a high traffic range, etc.). In the example of FIG. 2, the AP 210 can determine that controllers 240a, 240c, and 240d are handling high traffic. Subsequently, the AP 210 can automatically assign a "high" IPsec priority to controllers 240a, 240c, and 240d. Conversely, the AP 210 can determine whether any of the controllers 240a-240f are experiencing a volume of traffic volume that is considered as "low traffic" (e.g., traffic below a threshold, traffic within a low traffic range, etc.). For instance, the AP 210 identifies that the controllers 240b, 240e, and 240f are experiencing low traffic, and thus can automatically assign a "low" IPsec priority to the controllers 240b, 240e, and 240f.

The AP 210 can be configured to offload the processing to establish the IPsec SAs for "high" priority controllers to the hardware IPsec accelerator 212. In contrast, the AP 210 is configured to offload establishing the IPsec SAs for "low" priority controllers to the software IPsec accelerator 211 if the hardware IPsec accelerator 212 has reached its resource limitation. According to this scheme, the controllers 240a, 240c, and 240d that are managing a larger percentage of the network's traffic (e.g., experiencing high traffic) will receive the more efficient IPsec offloading implementation that supports higher throughout, namely the IPsec hardware accelerator 212. In addition, the AP 210 may determine that the hardware IPsec software accelerator 212 has reached its resource limitation with supporting IPsec tunnels 220a-220c. The AP 210 can then switch to the employing the IPsec software accelerator 211. Thus, the controllers 240b, 240e, and 240f that are handling less traffic on the network (e.g., experiencing low traffic) will have their IPsec SAs orchestrated using the IPsec software accelerator 212. In accordance with this scheme, FIG. 2 illustrates that the AP 210 has established: IPsec tunnel 220a with controller 240a, IPsec tunnel 220b with controller 240c, and IPsec tunnel 220c with controller 240d via the hardware IPsec accelerator 212; and IPsec tunnel 230a with controller 240b, IPsec tunnel 230b with controller 240e, and IPsec tunnel 230c with controller 2404 via the software IPsec accelerator 211.

There may be scenarios where the AP 210 can offload IPsec SAs for all of the controllers having a high IPsec priority in the deployment, without reaching the hardware's resource limitation. In this case, the AP 210 is configured to continue utilizing the IPsec hardware accelerator 212, even to setup the IPsec SAs for controllers that are assigned low IPsec priority. In other words, the AP 210 does not switch the IPsec offloading to the software-based implementation, until the hardware-based implementation is used to its full capacity.

Figure 3:
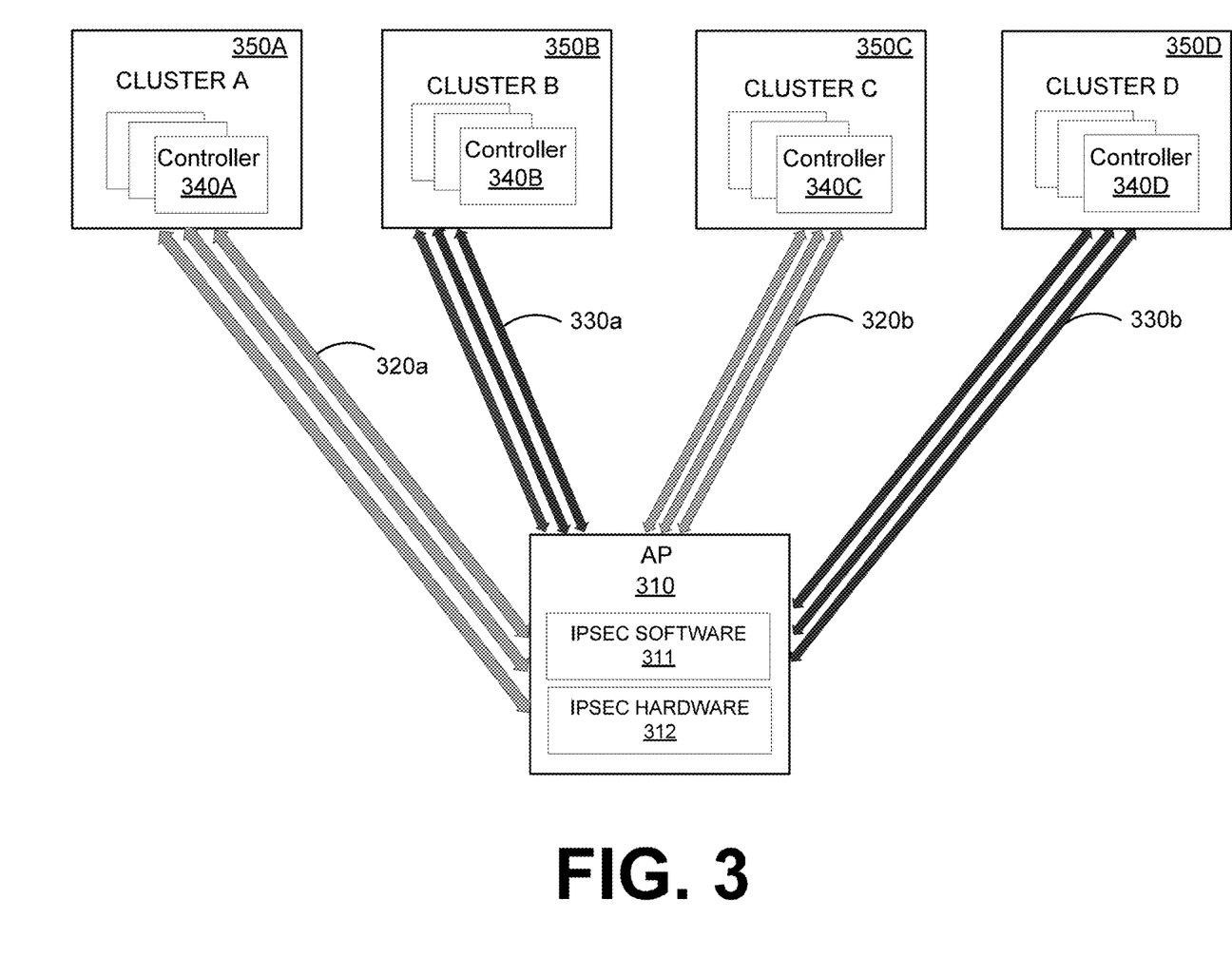
FIG. 3 illustrates an example of a multiple cluster networking environment for implementing the disclosed IPsec SA balancing technology, in accordance with the disclosure.

Referring now to FIG. 3, an example of another environment 300 is depicted, particularly a cluster multiple controller network configuration, where the disclosed IPsec SA balancing techniques may be employed. FIG. 3 includes substantially similar elements and functions as described above in reference to FIG. 1. Therefore, the general structure and function of these elements in FIG. 3, such as the controllers 340, AP 310, IPsec software accelerator 311, and IPsec hardware accelerator 312 are not described again in detail. Particularly, in the example, there a plurality of controllers 340 that are grouped together into respective clusters 350a-350d. That is, each of the clusters 350a-350d includes a grouping of several controllers 340 that are distributed therein. For instance, each of the clusters 350a-350d can be a group of controllers 340 that are located on the same network site. As an example, each of the clusters 350a-350d may be arranged on a respective local area network (LAN). Furthermore, the AP 310 has secure communications established with the multiple controllers 340 within each of the clusters 350a-350d. FIG. 3 illustrates that in the cluster multiple controller environment 300, the AP 310 balances all of the IPsec client traffic within one cluster. Therefore, the AP 310 will setup the same type of IPsec tunnel, either established by the IPsec software accelerator 311 or the IPsec hardware accelerator 312, for all of the controllers 340 within one of the respective clusters 350a-350d. For example, as shown in FIG. 3, the multiple IPsec tunnels 320a, 320b from the AP 310 to clusters 350a, 350c respectively, are all orchestrated via hardware-based IPsec offloading, and are supported using the IPsec hardware accelerator 312. The multiple IPsec tunnels 330a, 330b from the AP 310 to clusters 350b, 350d respectively, are orchestrated via software-based IPsec offloading, and are supported using the IPsec software accelerator 312.

In the cluster multiple controller environment 300, the AP 310 can be configured to identify an IPsec priority that is associated with each of the clusters 350a-350d, rather than an IPsec priority for each individual controller as used in the non-cluster multiple controller deployment of FIG. 2. Each of the clusters 350a-350d can have a corresponding IPsec priority that has been previously defined or is dynamically determined by the AP 310, in the same manner described above in detail in reference to FIG. 2. As an example, the AP 310 can identify the clusters 350a, 305c as having a "high" IPsec priority (e.g., experiencing a volume of traffic volume that is considered as "high traffic"). Also, the AP 310 can identify the clusters 350b, 350d as having a "low" IPsec priority (e.g., experiencing a volume of traffic volume that is considered as "high traffic").

As a result, the AP 310 establishes the IPsec SAs for all of the controllers 340 on the "high" priority clusters 350a, 350c using hardware IPsec accelerator 212. Additionally, when the resource limitation for hardware IPsec accelerator 212 is met, the AP 310 can establish the IPsec SAs for all of the controllers 340 on the "low" priority clusters 350b, 350d using the software IPsec accelerator 211.

Figure 4:
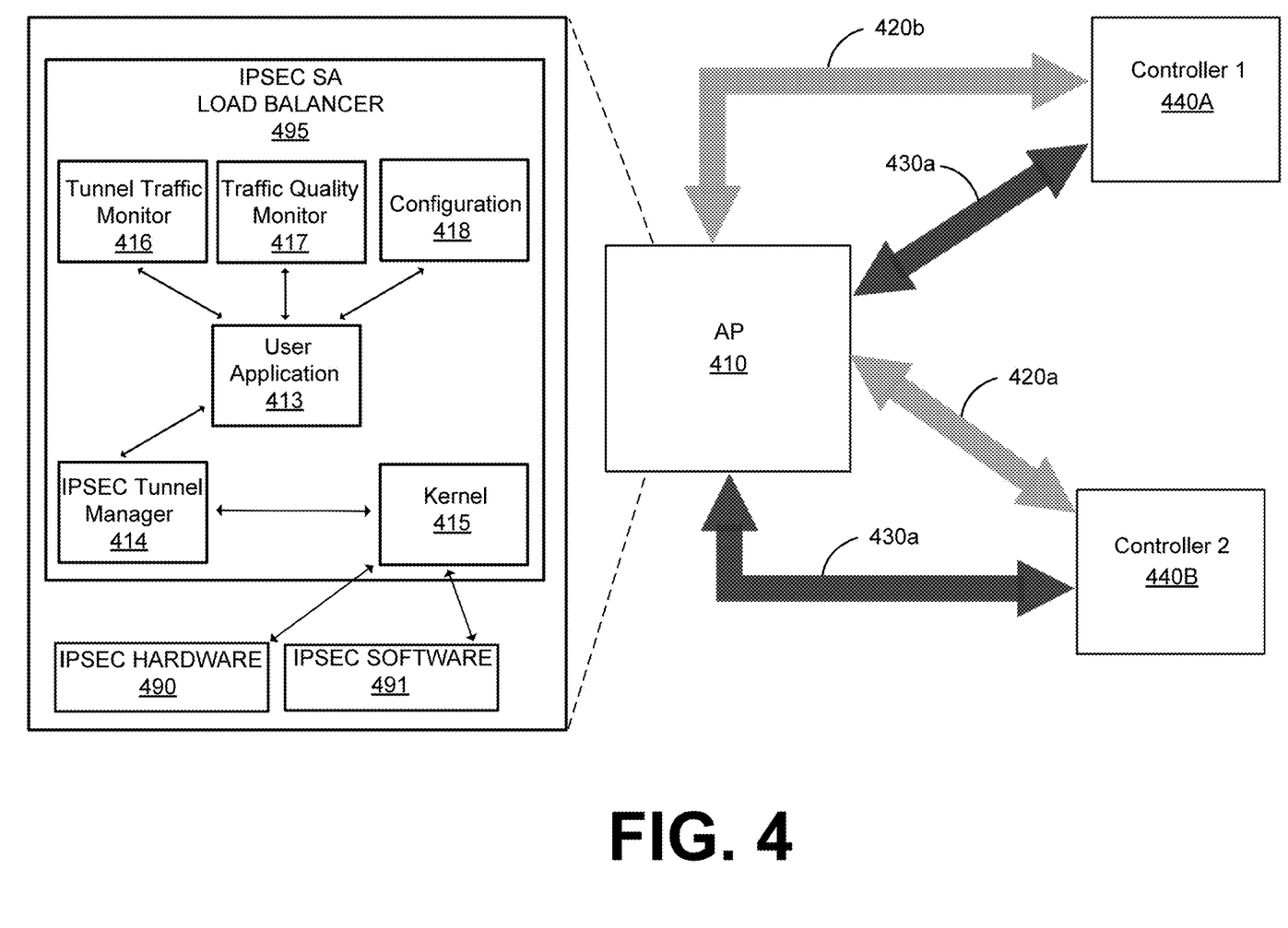
FIG. 4 depicts an example of an IPsec networking device implementing an aspect of the disclosed IPsec SA balancing technology, in accordance with the disclosure.

According to the embodiments, an aspect of the IPsec SA balancing techniques includes actively "upgrading" a connection for a controller from an IPsec tunnel supported using software-based IPsec offloading, to an IPsec tunnel supported using hardware-based IPsec offloading. As alluded to above, the hardware-based IPsec offloading implementations can have advantages (with respect to processing efficiency) over the software-based IPsec offloading implementations. Due to these advantages, such as increased throughout, IPsec tunnels orchestrated using IPsec hardware accelerators, for example, can provide better traffic performance (as compared to the software-based IPsec offloading implementations). To this end, FIG. 4 illustrates an AP 410 that is configured to perform the "upgrading" feature of the disclosed IPsec SA balancing. FIG. 4 includes substantially similar elements and functions as described above in reference to FIG. 1. Particularly, FIG. 4 depicts an AP 410 that includes the IPsec SA load balancer 195, the IPsec software accelerator 190, and IPsec hardware accelerator 191 that are described in detail in FIG. 1.

There are various scenarios where it may be optimal to "upgrade" a controller that initially had an IPsec tunnel supported via the IPsec software accelerator 190 to an IPsec tunnel supported via the IPsec hardware accelerator 191. As an example, the AP 410 may need to orchestrate an IPsec SA for a controller having a "high" IPsec priority. However, the IPsec hardware accelerator 191 may be nearing the number of IPsec tunnels that can be supported based on its resource limitations. In another example, the IPsec hardware accelerator 191 may have already reached its resource limitation. However, a controller that is currently utilizing an IPsec tunnel of the IPsec software accelerator 190, may need to "upgrade" to an IPsec tunnel of the IPsec hardware accelerator 191, for instance because the controller is now experiencing high traffic, or is now supporting traffic associated with a higher QOS requirement, or other conditions that may be related to the IPsec priority previously described. As a general description, in these cases, the AP 410 can "downgrade" a controller that has an IPsec tunnel supported by the hardware-based IPsec offloading implementations, despite having a "low" IPsec priority. Then, subsequently, the AP 410 can "upgrade" a controller that has an IPsec tunnel supported by the software-based IPsec offloading implementations, despite having a "high" IPsec priority.

Particularly, FIG. 4 illustrates that IPsec SA load balancer 195, implemented on the AP 410, can include several internal components, including, but not limited to: tunnel traffic 416 monitor; traffic quality monitor 417; configuration module 418; a user application 413; an IPsec tunnel manager 414 which manages the IPsec tunnels that are setup and supported by the AP 410; and a kernel 415 that facilitates command and/or control communication between the IPsec tunnel manager 414, the IPsec software accelerator 190, and the IPsec hardware accelerator 191. These components of the IPsec SA load balancer 195 can be implemented as hardware, software, firmware, or a combination thereof.

Accordingly, the AP 410 has the capability to determine whether the controllers 440a, 440b are experiencing a condition that would trigger the disclosed "upgrade" scheme, such as QOS or high traffic volume. In operation, the AP 410 can initially establish the IPsec tunnel 430a for controller 440a using the IPsec software accelerator 190. Further, the AP 410 has previously setup an IPsec tunnel 420a for controller 440b using the IPsec hardware accelerator 191, while the controller 440b is identified as a having "low" IPsec priority. Subsequently, the AP 410 can make a determined that the IPsec hardware accelerator 191 has reached the maximum number of IPsec tunnels for its resource limitation. The AP 410 may also determine that the controller 440a is now experiencing high traffic, for example using the tunnel traffic monitor 416 and thus needs to be "upgraded" from its current software supported IPsec tunnel 430a to a hardware supported IPsec tunnel in order to ensure good performance for this larger volume of traffic being handled by the controller 440a.

The AP 410 has the capability to examine the configuration of the IPsec SA balancing being utilized (e.g., the IPsec tunnel types, IPsec tunnel end nodes, etc.). Based on the configuration, the AP 410 can further detect which controller(s) having a "low" IPsec priority, also have an IPsec tunnel that is setup using the hardware IPsec offloading implementation, in order to "downgrade" one or more of those controllers to a secondary, or "stand-by", IPsec tunnel that is setup using the software IPsec offloading implementation. In the example, the AP 410 can detect that the controller 440b has a "low" IPsec priority, but is using the IPsec tunnel 420a that is supported using the IPsec hardware accelerator 190. In response, the AP 410 can "downgrade" controller 440b by establishing the second IPsec tunnel 430b as a stand-by IPsec tunnel to the controller 440b. This stand-by IPsec tunnel 430b has its IPsec SAs orchestrated by the IPsec software accelerator 191. After the stand-by IPsec tunnel 430b is successfully established, traffic can begin passing through the stand-by IPsec tunnel 430b rather than the initial IPsec tunnel 420a. Since the IPsec tunnel 420a is not being actively employed by the controller 440b, the AP 410 can then terminate that IPsec tunnel 420 which frees the IPsec SAs in the IPsec hardware accelerator 190. An IPsec tunnel is closed when its IPsec SAs terminate through deletion (or by timing out). Consequently, by releasing IPsec tunnels, the IPsec hardware accelerator 190 is operating below its resource limitation and has processing capacity to support subsequent IPsec SAs.

Subsequently, the AP 410 can employ the IPsec hardware accelerator 190 to establish IPsec tunnel 420b as a stand-by IPsec tunnel for the controller 440a. The AP 410 takes down the previous IPsec tunnel 430a set up by the IPsec software accelerator 191 to allow the controller 440a, which has a "high" IPsec priority, to now communicate its traffic via the IPsec tunnel 430b for improved performance. The IPsec "upgrade" aspects of the disclosed IPsec SA balancing techniques illustrated in FIG. 4 may be suitable for scenarios when the CPU load on the AP is not high. Alternatively, in cases when the CPU load is high at the AP (which is less conducive to relying on software-based IPsec offloading implementations that consumes CPU resources) another scheme for IPsec SA loading that involves dedicated and shared hardware crypto channels, depicted in FIG. 5, can be employed.

Figure 5:
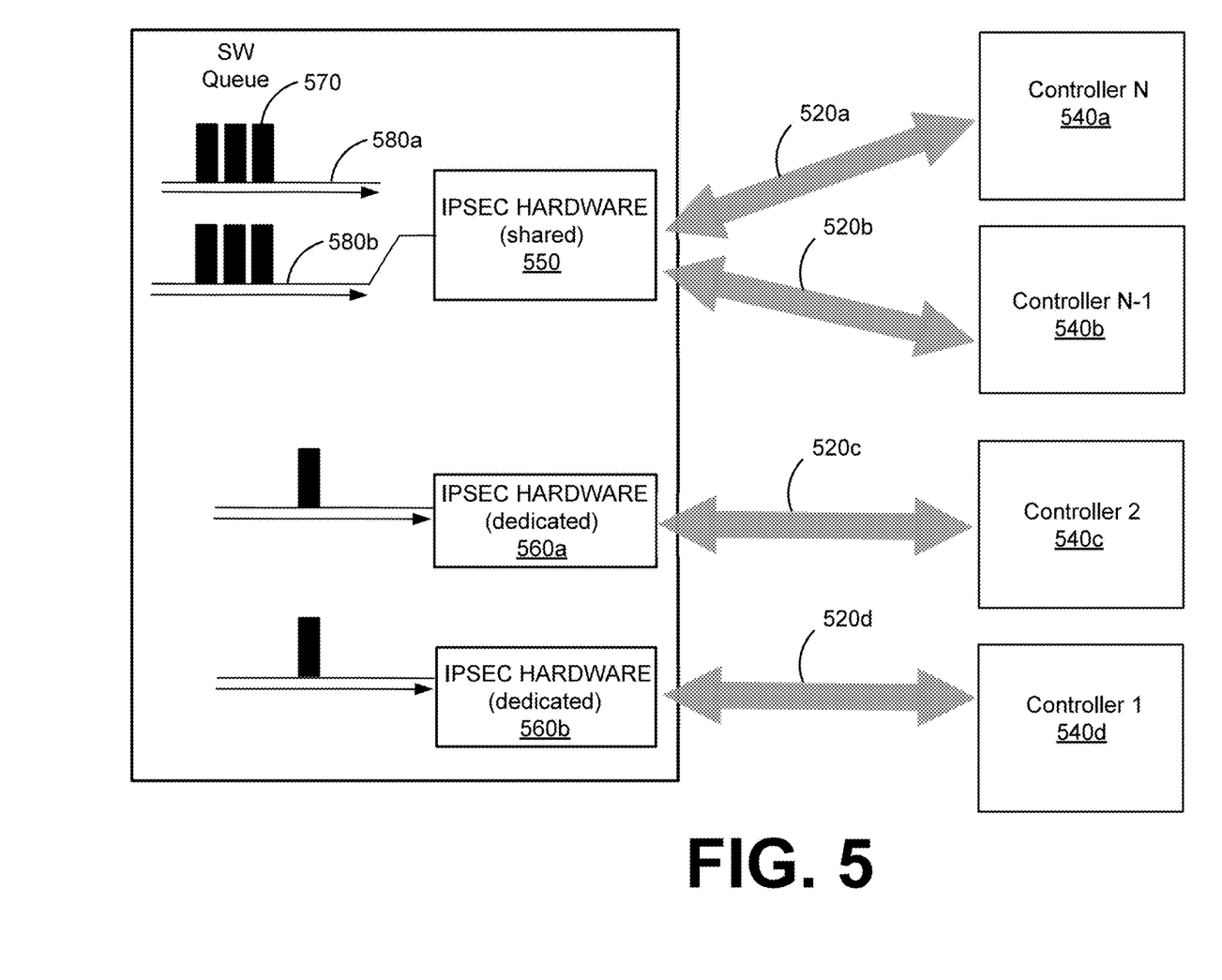
FIG. 5 depicts an example of an IPsec networking device implementing another aspect of the disclosed IPsec SA balancing technology, in accordance with the disclosure.

FIG. 5 depicts an example of an AP 510 implementing multiple channels that command or/or control the data that is sent to the IPsec offloading hardware, such as an IPsec hardware accelerator (not shown), for processing. In the illustrated example, AP 510 includes dedicated hardware channels 560a, 560b, and a shared hardware channel 550. The AP 510 is configured to distribute the IPsec SAs for traffic based the characteristics of the controller and/or the IPsec tunnel. For example, if the AP 510 determines that an IPsec tunnel is handling a high traffic load, that IPsec tunnel will be assigned a dedicated hardware crypto channel. FIG. 5 shows dedicated hardware channel 560b being used for IPsec tunnel 520d to controller 540d; and dedicated hardware channel 560a being used for IPsec tunnel 520c to controller 540c. In other words, the dedicated hardware channels 560a, 560b are each configured to respectively handle the data for one IPsec tunnel and one controller, in order to have the corresponding IPsec SAs processed by IPsec hardware accelerator.

Further, the AP 510 includes a shared hardware crypto channel 550 that is being shared by multiple IPsec tunnels 520a, 520b to the controllers 540a, 540b respectively. Regarding the shared hardware crypto channel 550, the AP 510 (employing the IPsec tunnel manager of the IPsec SA load balancer) can apply a queue 570 to appropriately handle the traffic that corresponds to controllers 540a, 540b that are both utilizing the shared hardware crypto channel 550. Thus, in accordance with a scheduling scheme (e.g., FIFO, LIFO, etc.) of the queue 570, the hardware, such as the IPsec hardware accelerator, will switch to begin processing the IPsec SA for the traffic/IPsec tunnel for communication from the queue 570. For example, the queue 570 can first output traffic 580b for the IPsec tunnel 520b. Accordingly, the hardware processes the IPsec SAs to enable the shared crypto channel 550 for secure communication of the traffic 580b to the controller 540b over IPsec tunnel 520b. Then, the queue 570 can switch to begin outputting traffic 580a for the IPsec tunnel 520a. As a result, the shared crypto channel 550 will be enabled for transmitting traffic 580a to the controller 540a over IPsec tunnel 520a. Consequently, the IPsec SA loading technique illustrated in FIG. 5 can leverage hardware channels in a manner that allows the IPsec hardware accelerator, for instance, to be shared by switching between different controllers for more efficient traffic processing (e.g., reducing the amount of software-based IPsec offloading utilized).

Figure 6:
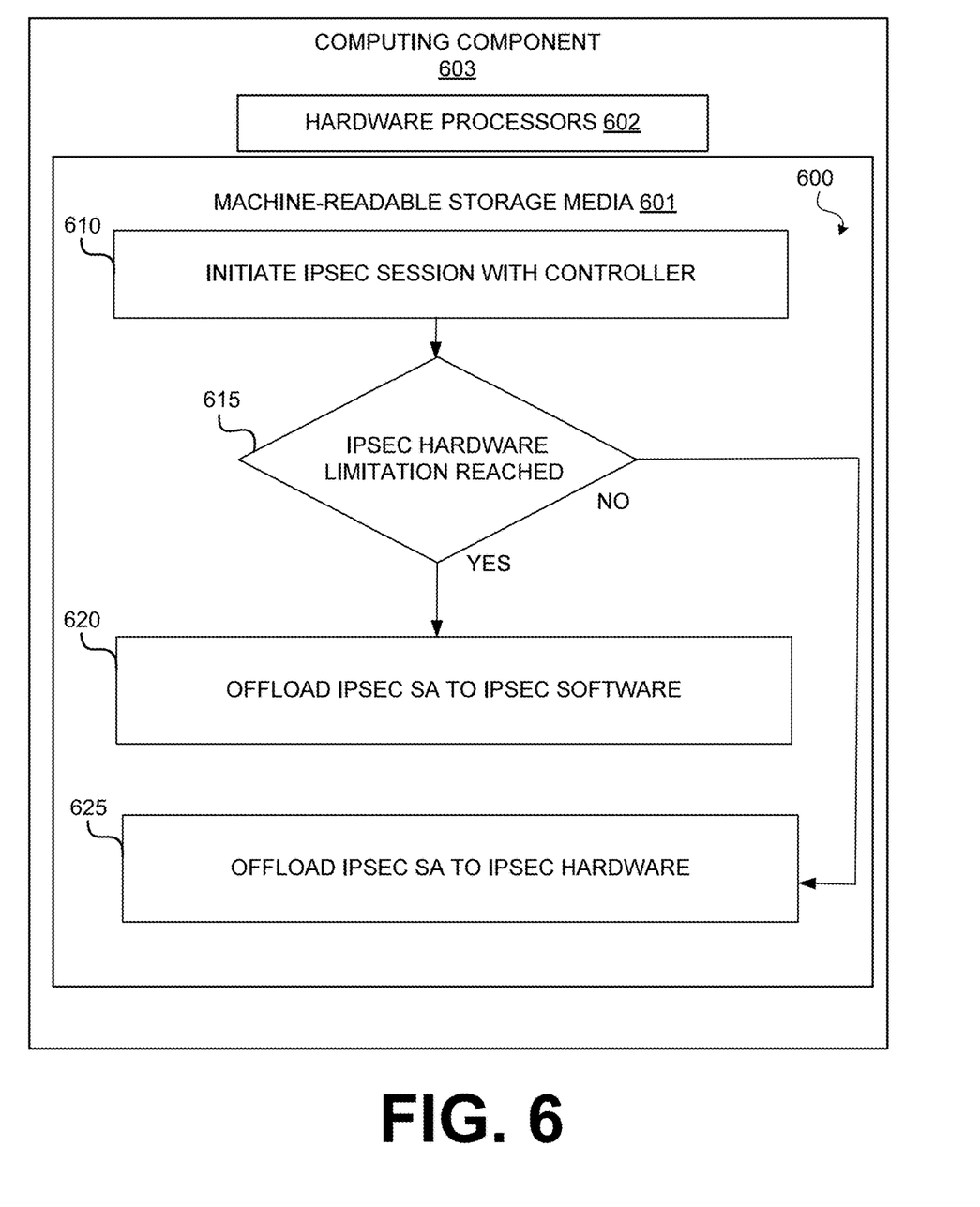
FIG. 6 is an operational flow diagram illustrating an example method for implementing the disclosed IPsec SA balancing technology, in accordance with implementations of the disclosure.

FIG. 6 is an operational flow diagram illustrating an example method 600 for implemented an IPsec SA balancing scheme, as disclosed herein. The process 600 is illustrated as a series of executable operations in a machine-readable storage media 601 performed by a hardware processor 602. The computing component 603 can be a computer device that is an IPsec networking device, such as an AP (shown in FIG. 1), as previously described.

In an example, IPsec peers may wish to authenticate and initiate a secure connection through a network, by initiating an IPsec data exchange to establish a connection including a secure IPsec tunnel. As part of IPsec data exchange process, incoming and outgoing security keys and IPsec SAs may be initialized and updated over time. The IPsec networking device, such as an AP, may function to transparently process and route information, in accordance with an IPsec protocol. Thus, IPsec may be used to build a virtual private network (VPN) for the remote sites across a network that may be a public network (e.g., the Internet).

The process 600 can being with initiating an IP session at operation 610. An IPsec session initiation, which involves establishing an IPsec tunnel, may be triggered by the network traffic. For instance, traffic of a particular type that being transmitted to the controller may be flagged for protection. In order to carry out the initiated IPsec session, the IPsec network device starts processing to execute the IPsec related functions. For example, an IPsec tunnel between the IPsec peers needs to be configured and established for an IPsec session. Additionally, there are encryption/decryption functions, and negotiations of keys and other parameters for the IPsec SAs that are all involved in the IPsec session. Thus, after the IPsec session initiation, the process 600 can continue to operation 615 in order to ultimately offload the IPsec processing to either a software-based IPsec accelerator or a hardware-based IPsec accelerator.

As previously described, the IPsec network device, such as an AP, can be enabled with both an IPsec hardware accelerator and an IPsec software accelerator. Also, according to one of the IPsec SA loading schemes, use of the IPsec hardware accelerator is prioritized over the IPsec software accelerator. In other words, the process 600 utilizes the IPsec hardware accelerator until it is deemed potentially determinantal, for example reaching a resource limitation of the hardware. Thus, at operation 615, the IPsec network device performs a conditional check to determine whether the IPsec hardware accelerator has reached its resource limit. For example, the IPsec hardware accelerator can have design characteristics that restricts the hardware to support a certain number of IPsec tunnels simultaneously. As a result, operation 615 can include detecting a current number of IPsec tunnels that are established and/or supported by the IPsec hardware accelerator. Although operation 615 is discussed with respect to the number of active IPsec tunnels, there are other forms of comparisons, checks, and calculations that can be performed to determine whether the resource limitations of the IPsec hardware accelerator has been reached (e.g., CPU cycle costs, CPU processing cost, latency, etc.) that are not described in detail for purposes of brevity.

In the case where the current number of IPsec tunnels is less than the number of the IPsec tunnels allowed by the IPsec hardware accelerators resource limitation, this indicates that the hardware is operating below its available capacity and the resource limitation has not been reached and/or exceeded (shown as "No" in FIG. 6). Consequently, the process 600 can continue to use the IPsec hardware accelerator without the risk of negatively effecting the IPsec performance by operating past the hardware's limitations. Thereafter, the process 600 proceeds to operation 625. At operation 625, the IPsec networking device can offload the IPsec SA related processing for the initiated IPsec session to the IPsec hardware accelerator. Subsequently, the IPsec session between the IPsec peers, namely the AP and the controller can be conducted in order to provide secure communications over the network.

Referring back to operation 615, the IPsec network device can alternatively determine that the current number of IPsec tunnels is equal to and/or greater than the number of the IPsec tunnels allowed by the IPsec hardware accelerators resource limitation. In this case, the result of operation 615 indicates that the hardware is operating at (or above) its available capacity and the resource limitation has been reached and/or exceeded (shown as "Yes" in FIG. 6). Thus, the process 600 has determined that continuing to use the IPsec hardware accelerator may push the hardware beyond its capabilities, and greatly increases the potential to negatively impact the IPsec processing. In this case, it is beneficial to utilize the IPsec software accelerator that is also enabled on the IPsec networking device. As alluded to above, the IPsec software accelerator continues to use CPU resources of the host, but it is not restricted, for example to a certain number of IPsec tunnels, in the same manner as the hardware-based implementation. Thus, the IPsec software accelerator has a flexibility that can be advantageous in larger scale systems. Consequently, the process 600 continues to operation 620 to employ the IPsec software accelerator.

At operation 620, in order to establish the initiated IPsec session, the IPsec network device switches from the IPsec hardware accelerator, and offloads the processing for this IPsec SA to the IPsec software accelerator. Any previously established IPsec SAs (and IPsec tunnels) that are and were configured by the IPsec hardware accelerator can continue to operate using the IPsec hardware accelerator. Therefore, the process 600 does not incur any additional overhead that would be associated with switching already active IPsec session between the software-implementation and the hardware-implementation. Instead, operation 620 offloads to the IPsec software accelerator specifically to orchestrate the IPsec SAs for the currently initiated IPsec session. Subsequently, the IPsec session between the IPsec peers, namely the AP and the controller can be conducted in order to provide secure communications over the network.

Figure 7:
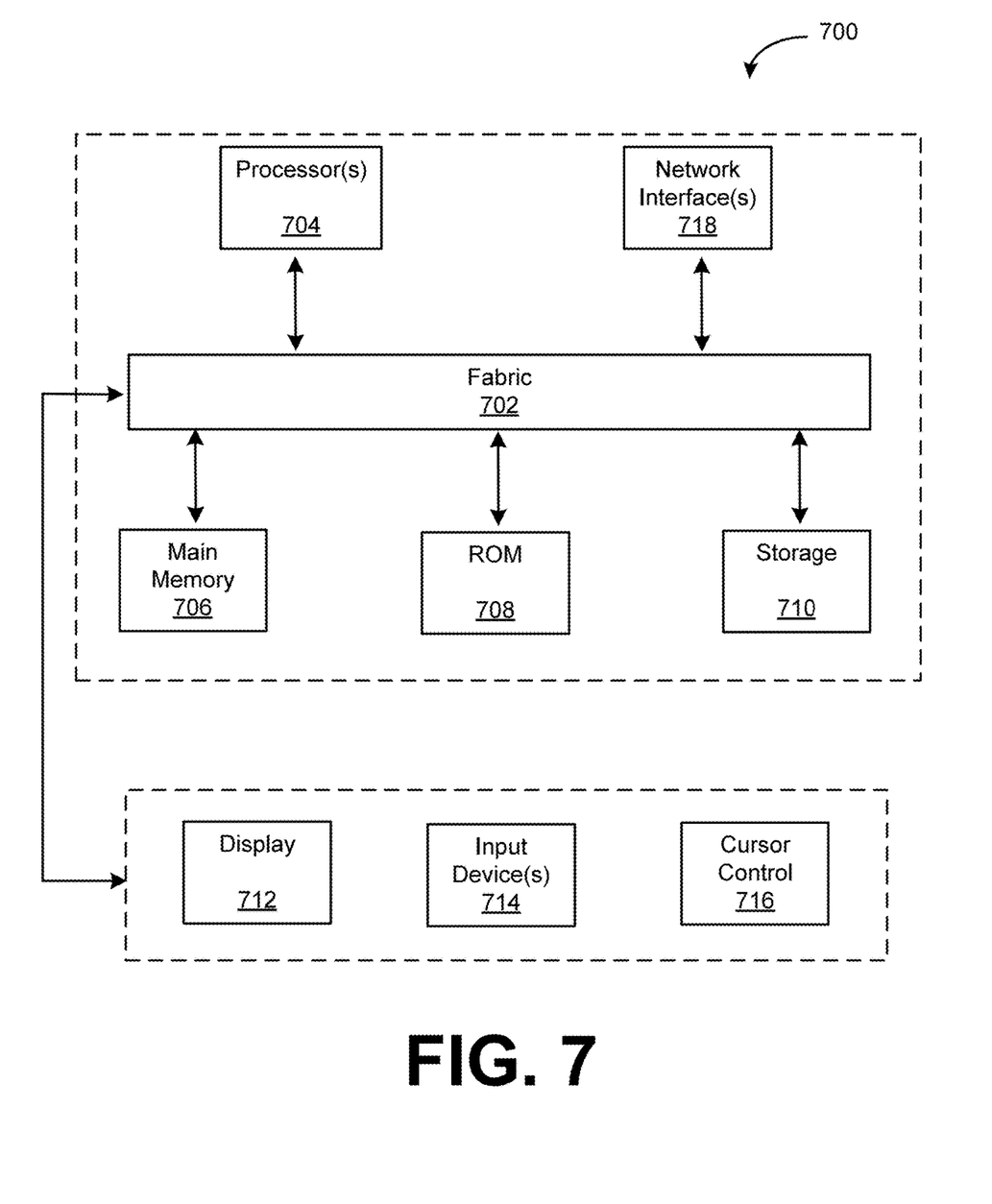
FIG. 7 depicts a block diagram of an example computer system in which various of the embodiments described herein may be implemented.

FIG. 7 depicts a block diagram of an example computer system 700 in which the IPsec SA loading techniques described herein may be implemented. For example, the computer system 700 may be an IPsec networking device, such as an AP (shown in FIG. 1), as described in detail above. The computer system 700 includes a fabric 702 or other communication mechanism for communicating information, one or more hardware processors 704 coupled with fabric 702 for processing information. Hardware processor(s) 704 may be, for example, one or more general purpose microprocessors.

The computer system 700 also includes a main memory 706, such as a random-access memory (RAM), cache and/or other dynamic storage devices, coupled to fabric 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes storage devices 710 such as a read only memory (ROM) or other static storage device coupled to fabric 702 for storing static information and instructions for processor 704. A storage device 710, such as a magnetic disk, optical disk, or USB thumb drive (Flash drive), etc., is provided and coupled to fabric 702 for storing information and instructions.

The computer system 700 may be coupled via fabric 702 to a display 712, such as a liquid crystal display (LCD) (or touch screen), for displaying information to a computer user. An input device 714, including alphanumeric and other keys, is coupled to fabric 702 for communicating information and command selections to processor 704. Another type of user input device is cursor control 516, such as a mouse, a trackball, or cursor direction keys for communicating direction information and command selections to processor 504 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   initiating, by an Internet Protocol Security (IPsec) networking device, an IPsec session;
   determining, by the IPsec networking device, whether a resource limitation for a hardware-based IPsec accelerator has been reached, wherein the hardware-based IPsec accelerator is enabled on the IPsec networking device; and
   in response to determining that the resource limitation for the hardware-based IPsec accelerator has been reached, offloading, by the IPsec networking device, processing for the IPsec security association (SA) associated with the initiated IPsec session to a software-based IPsec accelerator, wherein the software-based IPsec accelerator is enabled on the IPsec networking device,
wherein offloading the processing for the IPsec SA to the software-based IPsec accelerator comprises establishing an IPsec tunnel between the IPsec networking device and a controller of a multiple controller system using the software-based IPsec accelerator, and
wherein determining whether the resource limitation for the hardware-based IPsec accelerator has been reached, comprises:
  determining a current number of IPsec tunnels established by the hardware-based IPsec accelerator;
  comparing the current number of IPsec tunnels with a maximum number of IPsec tunnels corresponding to the resource limitation of the hardware-based IPsec accelerator; and
  in response to determining that the current number of IPsec tunnels has reached or exceeded the maximum number of IPsec tunnels, determining that the resource limitation for the hardware-based IPsec accelerator has been reached.

2. A system, comprising;
a plurality of controllers;
a communication network;
an Internet Protocol Security (IPsec) networking device communicatively connected to the plurality of controllers via the communication network, and comprising a machine-readable storage medium comprising instructions executable by the IPsec networking device to:
  initiate an Internet Protocol Security (IPsec) session for a first controller of the plurality of controllers;
  determine whether a resource limitation for a hardware-based IPsec accelerator has been reached;
  in response to a determination that the limitation for the hardware-based IPsec accelerator has been reached, establishing an initial IPsec SA for the first controller corresponding to the initiated IPsec session using a software-based IPsec accelerator;
  in response to a determination that the resource limitation for the hardware-based IPsec accelerator has been reached, and that the initiated IPsec session is associated with a first controller having a high IPsec priority;
    identify a second controller, of the plurality of controllers, associated with a low IPsec priority,
    wherein a hardware-based IPsec accelerator established an initial IPsec security association (SA) corresponding to the second controller, including an initial IPsec tunnel to the second controller,
  establish a secondary IPsec SA corresponding to the second controller, including a secondary IPsec tunnel to the second controller, using a software-based IPsec accelerator;
  communicate traffic corresponding to the second controller using the secondary IPsec tunnel to the second controller; and
  terminate the initial IPsec tunnel to the second controller.

3. The system of claim 2, wherein the instructions comprise instructions executable by the IPsec networking device to:
  establish a secondary IPsec SA for the first controller using the hardware-based IPsec accelerator.

4. The system of claim 3, wherein the instructions comprise instructions executable by the IPSec networking device to:
  establish, by the hardware-based IPsec accelerator, a secondary IPsec tunnel to the first controller corresponding to the secondary IPsec SA.

5. The system of claim 4, wherein the instructions comprise instructions executable by the IPsec networking device to:
  terminate the initial IPsec tunnel to the first controller; and
  communicate traffic corresponding to the initial IPsec session using the secondary IPsec tunnel to the first controller.

6. The system of claim 2, wherein an IPsec priority associated with the first controller corresponding to the initiated IPsec session is adjusted from a low IPsec priority to a high IPsec priority.

7. The system of claim 2, wherein the IPsec networking device comprises an access point (AP).

8. The system of claim 7, wherein the hardware-based IPsec accelerator and the software-based IPsec accelerator are enabled on the AP.

9. The system of claim 2, wherein the instructions to determine whether the resource limitation for the hardware-based IPsec accelerator has been reached comprise instructions executable to:
  determine a current number of IPsec tunnels established by the hardware-based IPsec accelerator;
  compare the current number of IPsec tunnels with a maximum number of IPsec tunnels corresponding to the resource limitation of the hardware-based IPsec accelerator; and
  in response to determining that the current number of IPsec tunnels has reached or exceeded the maximum number of IPsec tunnels, determine that the resource limitation for the hardware-based IPsec accelerator has been reached.

10. A non-transitory computer-readable storage medium comprising instructions executable by a processor of an Internet Protocol Security (IPsec) networking device to:
  initiate an IPsec session;
  determine whether a resource limitation for a hardware-based IPsec accelerator has been reached;
  identify an IPsec priority associated with the controller of the IPsec tunnel; and
  in response to a determination that the IPsec priority associated with the controller is low and that the resource limitation for the hardware-based IPsec accelerator has not been reached:
    offload the processing for an IPsec security association (SA) associated with the initiated IPsec session to the hardware-based IPsec accelerator; and
  in response to a determination that the resource limitation for the hardware-based IPsec accelerator has been reached:
    offload processing for the IPsec SA associated with the initiated IPsec session to a software-based IPsec accelerator;
    wherein the offloading the processing for the IPsec SA to the software-based IPsec accelerator comprises establishing an IPsec tunnel between the IPsec networking device and a controller of a multiple controller system using the software-based IPsec accelerator.

11. The non-transitory computer-readable storage medium of claim 10, the instructions comprising instructions executable by the processor of the IPsec networking device to:

in response to a determination that the IPsec priority associated with the controller is high and the resource limitation for the hardware-based IPsec accelerator has not been reached:

offload processing for the IPsec SA associated with the initiated IPsec session to the hardware-based IPsec accelerator.

12. The non-transitory computer-readable storage medium of claim 11, wherein the offloading the processing for the IPsec SA to the hardware-based IPsec accelerator comprises establishing an IPsec tunnel between the IPsec networking device and a controller of a multiple controller system using the hardware-based IPsec accelerator.

13. The non-transitory computer-readable storage medium of claim 10, wherein the IPsec priority is determined by the IPsec networking device based on at least one of:

an amount of traffic associated with the controller for the IPsec session, type of traffic, and quality of service (QOS).

14. The non-transitory computer-readable storage medium of claim 10, wherein the IPsec priority is assigned to the controller of the multiple controller system.

15. The non-transitory computer-readable storage medium of claim 10, wherein:

the controller is one of a plurality of controllers of a cluster of controllers in the multiple controller system; and the IPsec priority is assigned to the cluster comprising the controller.

16. The non-transitory computer-readable storage medium of claim 10, wherein the instructions to determine whether the resource limitation for the hardware-based IPsec accelerator has been reached, comprise instructions to:

determine a current number of IPsec tunnels established by the hardware-based IPsec accelerator;

compare the current number of IPsec tunnels with a maximum number of IPsec tunnels corresponding to the resource limitation of the hardware-based IPsec accelerator; and in response to determining that the current number of IPsec tunnels has reached or exceeded the maximum number of IPsec tunnels, determine that the resource limitation for the hardware-based IPsec accelerator has been reached.

* * * * *